US010562423B2

(12) United States Patent
Vander Sluis (10) Patent No.: US 10,562,423 B2
(45) Date of Patent: Feb. 18, 2020

(54) SLIDE ASSEMBLY FOR A MOTOR VEHICLE (71) Applicant: FAURECIA INTERIOR SYSTEMS, INC., Auburn Hills, MI (US)

(72) Inventor: Daniel Vander Sluis, Rochester Hills, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 150 days.

(21) Appl. No.: 15/821,263

(22) Filed: Nov. 22, 2017

(65) Prior Publication Data

US 2019/0152366 A1 May 23, 2019

(51) Int. Cl.
*B60N 2/75* (2018.01)
*F16F 1/54* (2006.01)
*F16F 3/087* (2006.01)
*F16F 1/376* (2006.01)

(52) U.S. Cl.
CPC .............. *B60N 2/773* (2018.02); *F16F 1/376* (2013.01); *F16F 1/54* (2013.01); *F16F 3/0876* (2013.01); *F16F 2224/025* (2013.01); *F16F 2230/0052* (2013.01); *F16F 2238/022* (2013.01)

(58) Field of Classification Search
CPC ...... F16F 1/376; F16F 1/54; F16F 2230/0052; F16F 2224/025; F16F 2238/022; F15F 3/0876; B60N 2/773
USPC ....................................... 296/1.09
See application file for complete search history.

(56) References Cited

U.S. PATENT DOCUMENTS

| 6,419,314 | B1* | 7/2002 | Scheerhorn ............... B60R 7/04 297/188.19 |
| 6,427,956 | B1 | 8/2002 | Heckmann et al. |
| 7,641,284 | B2 | 1/2010 | Jones et al. |
| 8,029,065 | B2 | 10/2011 | Wieczorek et al. |
| 8,333,432 | B2 | 12/2012 | Cone |
| 8,585,150 | B2 | 11/2013 | von Rothkirch und Panthen et al. |
| 9,533,608 | B2 | 1/2017 | von Rothkirch und Panthen et al. |
| 2005/0225148 | A1* | 10/2005 | Jones ........................ A47C 1/03 297/411.35 |
| 2014/0138975 | A1 | 5/2014 | Washio |

FOREIGN PATENT DOCUMENTS

| WO | 0017532 A1 | 3/2000 |
| WO | 2005035303 A1 | 4/2005 |

* cited by examiner

*Primary Examiner* — Joseph D. Pape
*Assistant Examiner* — Dana D Ivey
(74) *Attorney, Agent, or Firm* — LKGlobal | Lorenz & Kopf, LLP (57) ABSTRACT Slide assemblies for motor vehicles are provided. In one example, a slide assembly for a motor vehicle includes a first member and a second member that is slidingly coupled with the first member. A first leaf spring device is disposed between the first and second members for facilitating relative sliding movement between the first and second members. The first leaf spring device includes a raised contact portion that slidingly interfaces with one of the first and second members during the relative sliding movement.

15 Claims, 8 Drawing Sheets

SLIDE ASSEMBLY FOR A MOTOR VEHICLE

TECHNICAL FIELD

The technical field relates generally to slide assemblies for motor vehicles, and more particularly to slide assemblies, for example, for an interior of a motor vehicle and that include a leaf spring device for facilitating relative sliding movement between two members.

BACKGROUND

In modern motor vehicles, slide assemblies are often incorporated into various vehicle interior components for convenience and/or sliding function for vehicle operators and passengers. For example, center consoles located between the seats are a typical vehicle accessory that includes a storage compartment and a lid that is also used as an armrest. As a seat(s) may be adjusted in a forward-to-rearward direction, it is desirable that the armrest include a slide assembly that allows the armrest to be similarly adjusted with the seat(s).

In one example, disclosed in U.S. Pat. No. 6,419,314, issued to Scheerhorn, a cover assembly including a slidable armrest is provided. The cover assembly includes a cover for an arm to rest thereon and a base for openable covering a compartment. The cover and the base are coupled together by a U-shaped slide assembly so that the cover can slide relative to the base. Unfortunately, the slide assembly includes many components and is relatively complicated in structure, adding cost and complexity to the assembly.

Accordingly, it is desirable to provide an improved slide assembly that is simple in structure and relatively low cost. Furthermore, other desirable features and characteristics of the present disclosure will become apparent from the subsequent detailed description and the appended claims, taken in conjunction with the accompanying drawings and this background.

BRIEF SUMMARY

Slide assemblies for motor vehicles are provided herein. In accordance with an exemplary embodiment, a slide assembly for a motor vehicle includes a first member and a second member that is slidingly coupled with the first member. A first leaf spring device is disposed between the first and second members for facilitating relative sliding movement between the first and second members. The first leaf spring device includes a raised contact portion that slidingly interfaces with one of the first and second members during the relative sliding movement.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to slide assemblies for motor vehicles. The exemplary embodiments taught herein provide a slide assembly configured, for example, for mounting or using in an interior of a motor vehicle including a first member and a second member that is slidingly coupled with the first member. A first leaf spring device is disposed between the first and second members for facilitating relative sliding movement between the first and second members. As used herein, the phrase "relative sliding movement between the first and second members" is understood to mean that the first member slidingly moves relative to the second member, the second member slidingly moves relative to the first member, or the first and second members slidingly move relative to each other. The first leaf spring device includes a raised contact portion that slidingly interfaces with one of the first and second members during the relative sliding movement. In an exemplary embodiment, advantageously the slide assembly including the first and second members and the leaf spring device is relatively simple in structure and complexity and therefore, can be manufactured efficiently and at a relatively low cost.

An additional advantage of the slide assembly disclosed herein is that, in some embodiments, the first leaf spring device includes a first leaf spring section that extends generally in a first direction along a first leaf spring section total length from a first fixed end to a second rotating end that is constrained from moving in the first direction. The raised contact portion is disposed between the first fixed end and the second rotating end. By fixing the first fixed end and by constraining the second rotating end from moving in the first direction but allowing the second rotating end to rotate, the first leaf spring section can be tuned to deform in a predictable and consistent manner so that the raised contact portion slidingly interfaces with one of the first and second members at a predetermined resistance to facilitate relative sliding movement between the first and second members.

An additional advantage of the slide assembly disclosed herein is that, in some embodiments, the first leaf spring section includes a first tapered portion extending from the first fixed end in the first direction, a first bent portion extending from the first tapered portion in the first direction, a first flared portion extending from the first bent portion in the first direction, and a first angled portion extending between the first flared portion and the second rotating end. In an exemplary embodiment, the first tapered portion, the first bent portion, the first flared portion, and/or the first angled portion can be independently tuned to allow the first leaf spring section to deform in a predictable and consistent manner so that the raised contact portion slidingly interfaces with one of the first and second members at a predetermined resistance to facilitate relative sliding movement between the first and second members.

An additional advantage of the slide assembly disclosed herein is that, in some embodiments, the first flared portion includes at least a portion of the raised contact portion. In an exemplary embodiment, the first flared portion can be tuned so that the raised contact portion slidingly interfaces with one of the first and second members at a predetermined resistance to facilitate relative sliding movement between the first and second members.

An additional advantage of the slide assembly disclosed herein is that, in some embodiments, the first leaf spring section has an opening formed through the first tapered portion. In an exemplary embodiment, the opening helps tune the first tapered portion so that the raised contact portion slidingly interfaces with one of the first and second members at a predetermined resistance to facilitate relative sliding movement between the first and second members.

An additional advantage of the slide assembly disclosed herein is that, in some embodiments, the first leaf spring section has an opening formed through the first flared portion. In an exemplary embodiment, the opening helps tune the first flared portion so that the raised contact portion slidingly interfaces with one of the first and second members at a predetermined resistance to facilitate relative sliding movement between the first and second members.

An additional advantage of the slide assembly disclosed herein is that, in some embodiments, the first leaf spring section has an opening formed through the first angled portion and extending towards the raised contact portion. In an exemplary embodiment, the opening helps tune the first angled portion so that the raised contact portion slidingly interfaces with one of the first and second members at a predetermined resistance to facilitate relative sliding movement between the first and second members.

An additional advantage of the slide assembly disclosed herein is that, in some embodiments, the first leaf spring device includes an attachment portion that includes a body attachment portion and an attachment feature extending from the body attachment portion and attached to the first member. The first fixed end of the first leaf spring section is coupled to a first side of the body attachment portion and the raised contact portion slidingly interfaces with the second member during the relative sliding movement. In an exemplary embodiment, the attachment portion is a simple and relatively low-cost structure for attaching the first leaf spring device to the first member.

An additional advantage of the slide assembly disclosed herein is that, in some embodiments, the body attachment portion has a second side that is opposite the first side, and the first leaf spring device includes a second leaf spring section that extends generally in a second direction along a second leaf spring section total length from a third fixed end that is coupled to the second side of the body attachment portion to a fourth rotating end that is constrained from moving in the second direction. The second leaf spring section includes an additional raised contact portion that is disposed between the third fixed end and the fourth rotating end and that slidingly interfaces with the second member during the relative sliding movement. By fixing the third fixed end and by constraining the fourth rotating end from moving in the second direction but allowing the fourth rotating end to rotate, the second leaf spring section can be tuned to deform in a predictable and consistent manner so that the additional raised contact portion slidingly interfaces with one of the first and second members at a predetermined resistance to facilitate relative sliding movement between the first and second members.

An additional advantage of the slide assembly disclosed herein is that, in some embodiments, the slide assembly includes a second leaf spring device disposed between the first and second members for facilitating the relative sliding movement between the first and second members. The second leaf spring device includes an additional raised contact portion that slidingly interfaces with one of the first and second members during the relative sliding movement. In an exemplary embodiment, by including a second leaf spring device including the additional raised contact portion, the relative sliding movement between the first and second members is substantially smooth.

An additional advantage of the slide assembly disclosed herein is that, in some embodiments, the first member has a first lateral side portion including a first lateral inclined surface and a second lateral side portion opposite the first lateral side portion and including a second lateral inclined surface. The first leaf spring device is disposed on the first lateral inclined surface attached to the first lateral side portion and the second leaf spring device is disposed on the second lateral inclined surface attached to the first lateral side portion. The raised contact portion and the additional raised contact portion slidingly interface with the second member during the relative sliding movement. In an exemplary embodiment, by positioning the first leaf spring device on the first lateral inclined surface and the second leaf spring device on the second lateral inclined surface, predetermined resistance provided by each of the first and second leaf spring devices can be balanced such that relative sliding movement between the first and second members is substantially smooth.

An additional advantage of the slide assembly disclosed herein is that, in some embodiments, the second member has a third lateral side portion and a fourth lateral side portion opposite the third lateral side portion. The third lateral side portion includes a third lateral inclined surface that is substantially parallel with the first lateral inclined surface and the fourth lateral side portion includes a fourth lateral inclined surface that is substantially parallel with the second lateral inclined surface. The raised contact portion slidingly interfaces with the third lateral inclined surface and the additional raised contact portion slidingly interfaces with the fourth lateral inclined surface. In an exemplary embodiment, by having the raised contact portion slidingly interface with the third lateral inclined surface and the additional raised contact portion slidingly interface with the fourth lateral inclined surface, predetermined resistance provided by each of the raised contact portion and the additional raised contact portion can be balanced such that relative sliding movement between the first and second members is substantially smooth.

An additional advantage of the slide assembly disclosed herein is that, in some embodiments, the third lateral side portion includes a first negative feature and the fourth lateral side portion includes a second negative feature. The first and second negative features are cooperatively configured to receive the raised contact portion and the additional raised contact portions, respectively, to releasably hold the second member in a stop position relative to the first member. In an exemplary embodiment, such a configuration is relatively simple in structure and complexity and allows the slide assembly to be held in a stop position.

An additional advantage of the slide assembly disclosed herein is that, in some embodiments, the first leaf spring device is formed of a polymeric material. In an exemplary embodiment, by forming the first leaf spring device from polymeric material, relatively low-cost manufacturing processes, such as injection molding, compression molding, or the like can be employed to form the first leaf spring device.

An additional advantage of the slide assembly disclosed herein is that, in some embodiments, the polymeric material includes one of polyether sulfone (PES), polyether ether ketone (PEEK), and polyether imide (PEI). In an exemplary embodiment, PES, PEEK, and PEI are relatively high temperature resistant polymeric materials with excellent creep resistance. It has been found that by forming the first leaf spring device from such polymeric materials, the first leaf spring device provides a relatively consistent spring force over a broad temperature range and further, is relatively hard with a relatively low coefficient of friction for facilitating relative sliding movement between the first and second members.

An additional advantage of the slide assembly disclosed herein is that, in some embodiments, the slide assembly is configured as a slidable armrest assembly. In an exemplary embodiment, by configuring the slide assembly as a slidable armrest assembly, the slidable armrest assembly is simple in structure and relatively low cost.

A greater understanding of the slide assembly described above may be obtained through a review of the illustrations accompanying this application together with a review of the detailed description that follows.

Figure 1:
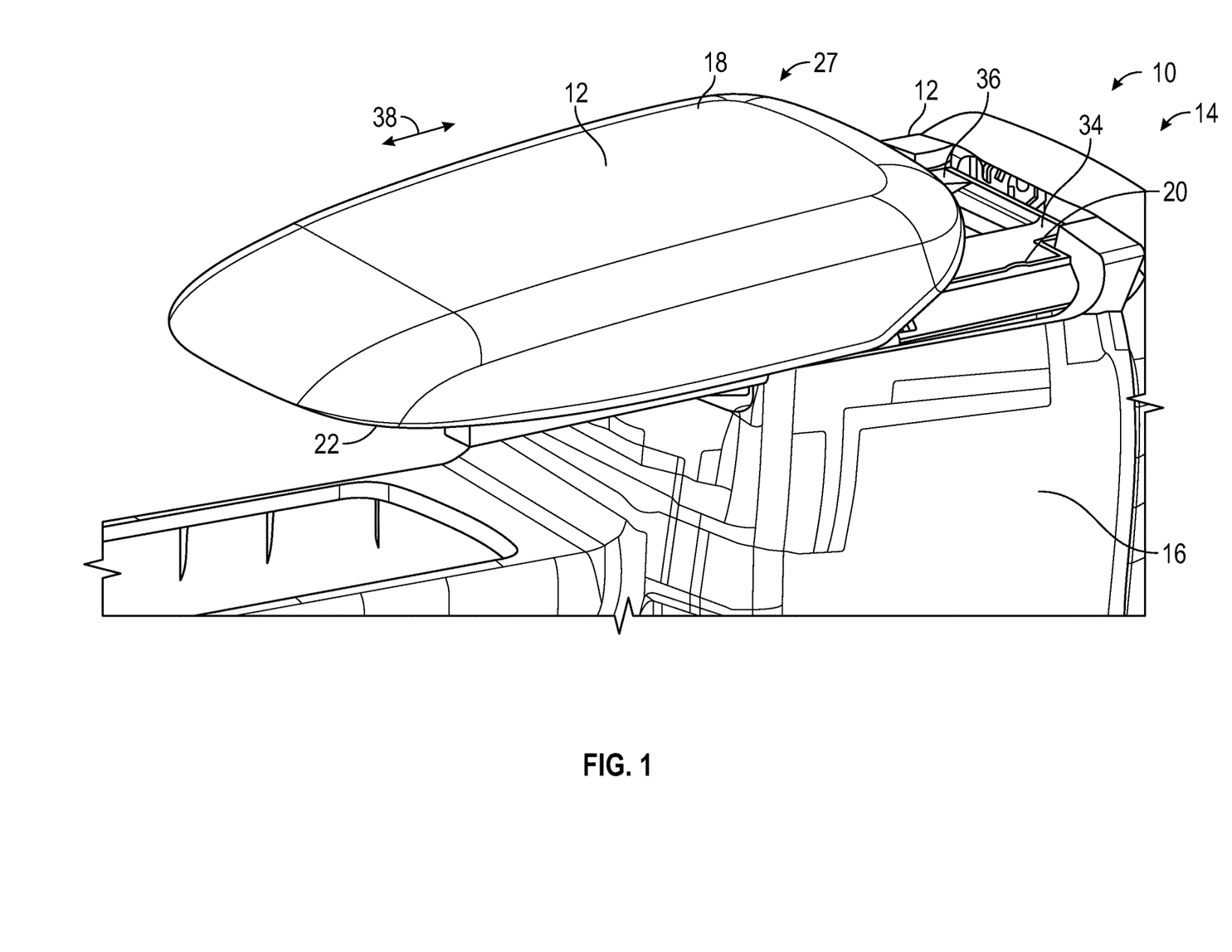
FIG. 1 illustrates a perspective view of an interior trim console including a slide assembly in accordance with an exemplary embodiment.
Figure 2A:
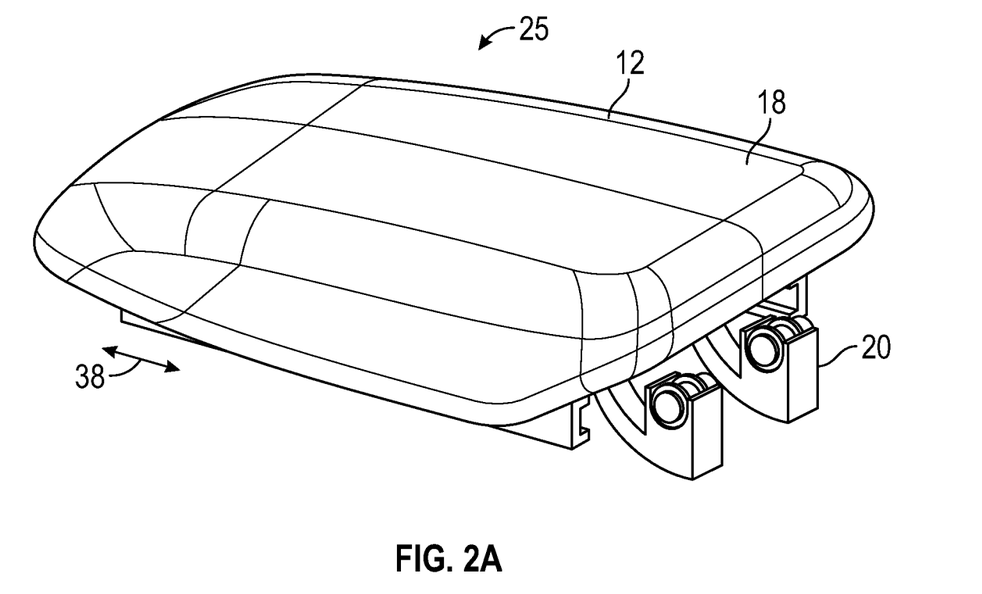
FIG. 2A illustrates a perspective view from above of a slide assembly in a first position in accordance with an exemplary embodiment.
Figure 2B:
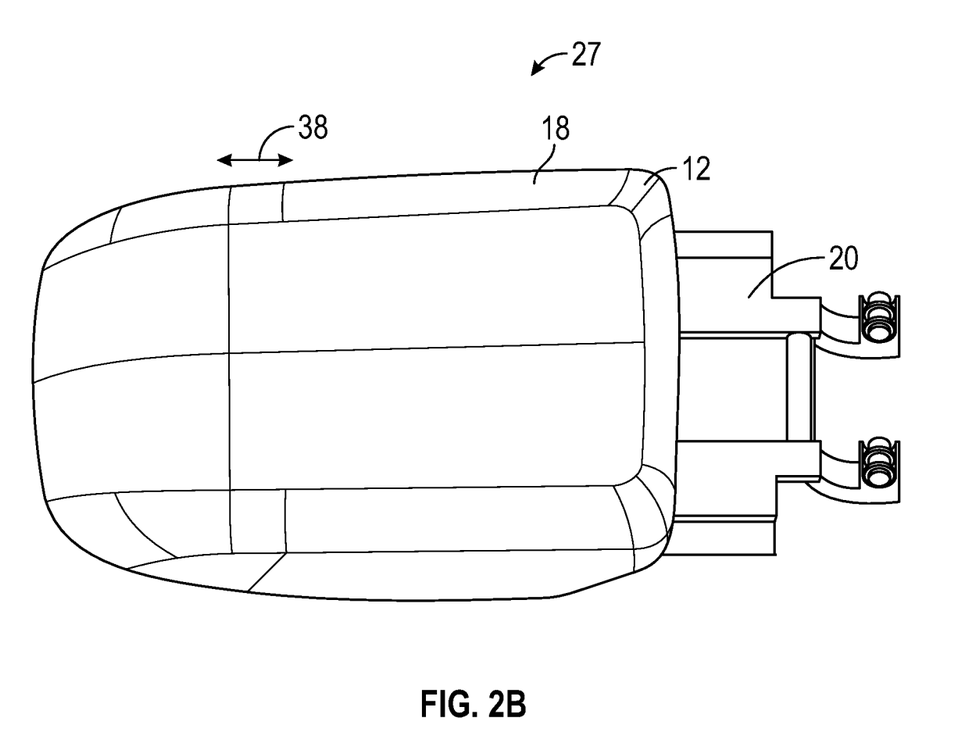
FIG. 2B illustrates a top view of the slide assembly depicted in FIG. 2A in a second position.
Figure 2C:
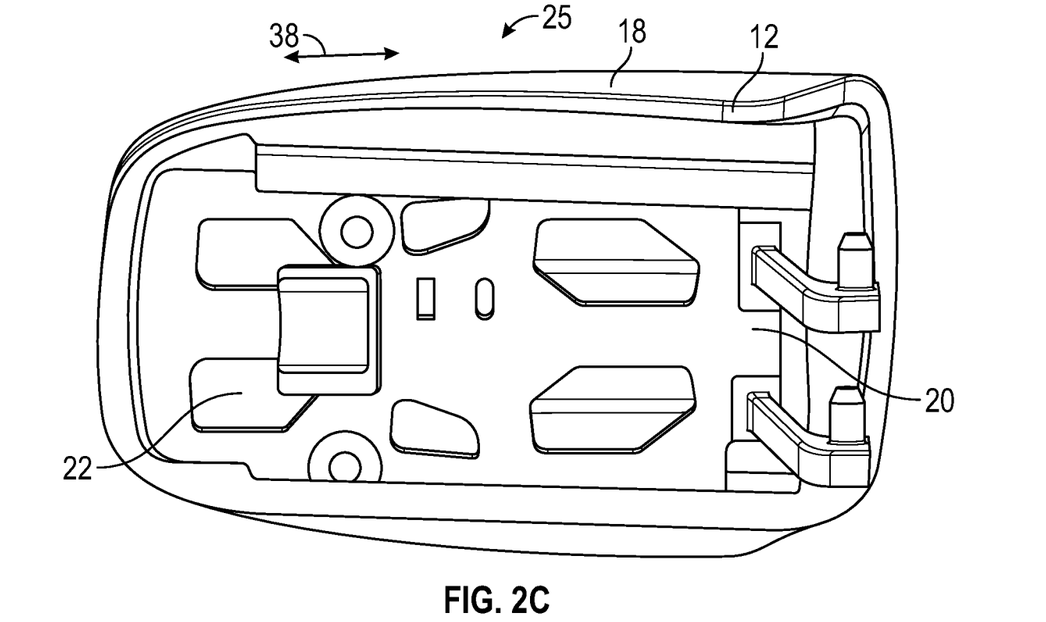
FIG. 2C illustrates a perspective view from below of the slide assembly depicted in FIG. 2A in the first position.
Figure 2D:
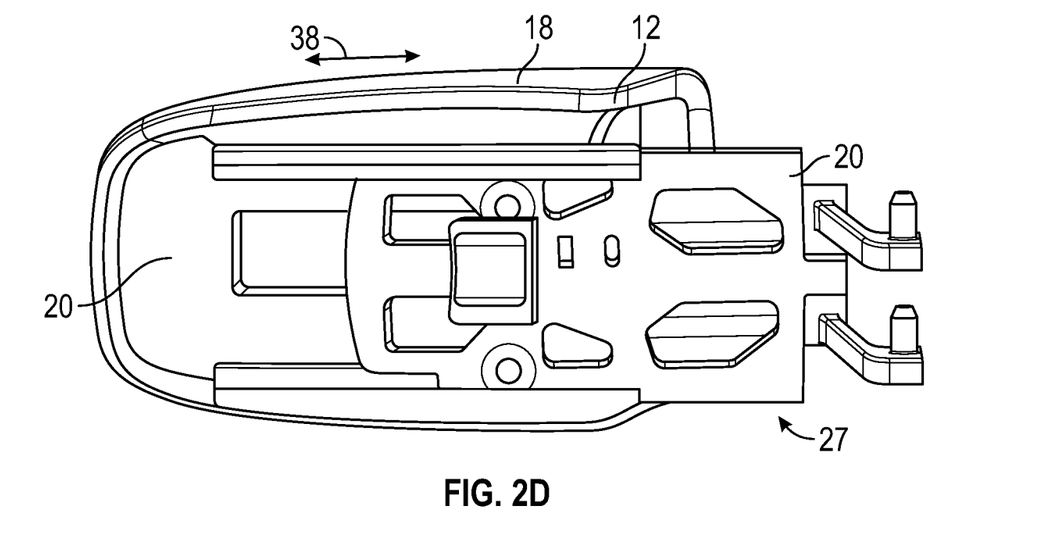
FIG. 2D illustrates a perspective view from below of the slide assembly depicted in FIG. 2A in the second position.

FIG. 1 illustrates a perspective view of an interior trim component 10 including a slide assembly 12 for a motor vehicle in accordance with an exemplary embodiment. As illustrated, the interior trim component 10 is configured as a center console 14 that is arranged, for example, between vehicle seats and that includes a storage compartment 16. The slide assembly 12 is configured as a slidable armrest 18 that functions as a lid that covers the storage compartment 16 and that can be adjusted in a forward-to-rearward direction (indicated by double headed arrow 38). Alternatively, the slide assembly 12 can be incorporated into other interior trim components, e.g., instrument panel, door panel, and the like, and/or other areas of the motor vehicle.

Figure 3:
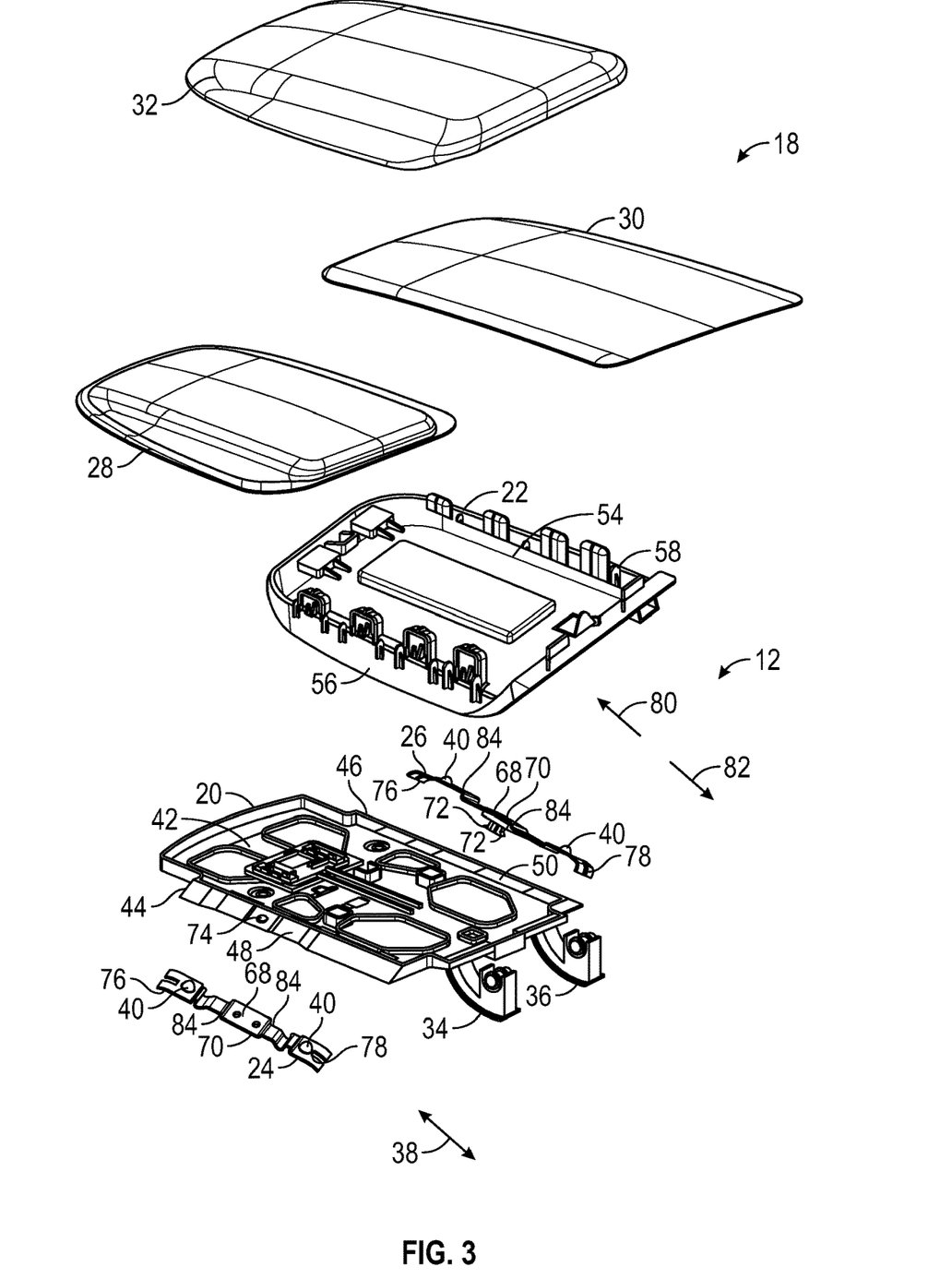
FIG. 3 illustrates an exploded view of a slide assembly in accordance with an exemplary embodiment.

Referring to FIGS. 1-3, the slide assembly 12 includes member 20 (e.g., a base substrate and/or corresponding to a first member) and member 22 (e.g., lower lid portion and/or corresponding to a second member) that are slidingly coupled together. As will be discussed in further detail below, leaf spring devices 24 and 26 (e.g., corresponding to a first leaf spring device and a second leaf spring device, respectively) are disposed between the members 20 and 22 for facilitating relative sliding movement between the members 20 and 22, for example, in the forward-to-rearward direction 38 from a stowed position 25 (e.g., first stop position) to an extended position 27 (e.g., second stop position) and vice versa.

Referring to FIGS. 1 and 3-6, the member 22 may be decorated for aesthetics reasons and/or to provide comfort as the slidable armrest 18 for supporting an arm of a vehicle occupant. For example, the slide assembly 12 may include an upper lid portion 28 that is coupled to the member 22, a foam pad 30 overlying the upper lid portion 28, and an outer covering 32 (e.g., leather cover skin, PVC cover skin, TPO cover skin, or the like) that covers the foam pad 30 and the upper lid portion 28. Further, the member 20 may include attachments arms 34 and 36 for mounting and/or pivotably coupling the slide assembly 12 to the remaining portion(s) of the interior trim component 10.

Figure 4:
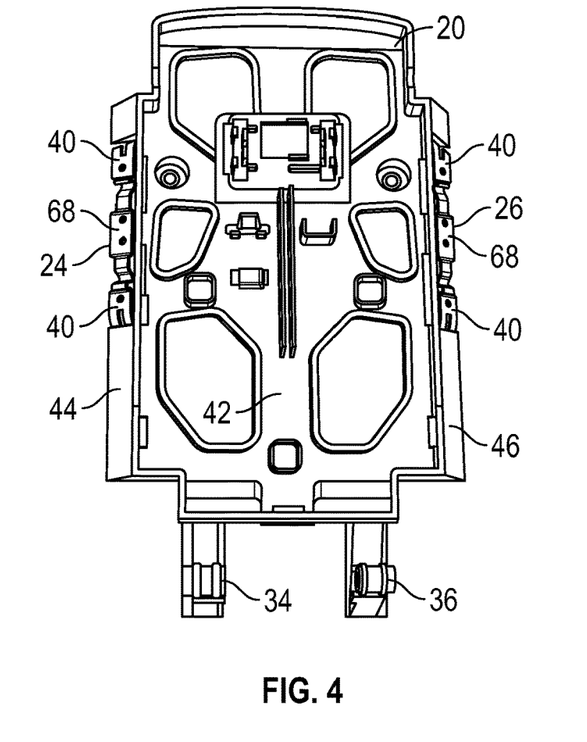
FIG. 4 illustrates a top view of a first member of a slide assembly in accordance with an exemplary embodiment.

As will be discussed in further detail below, the leaf spring devices 24 and 26 include raised contact portions 40 (e.g., pillow or button portions such as semi-spherical shaped portions or the like that protrude for sliding contact) that slidingly interface with the member 22 during relative sliding movement between the members 20 and 22. In an exemplary embodiment, the leaf spring devices 24 and 26 are attached to the member 20. In particular, the member 20 has a base body portion 42 that extends between lateral side portions 44 and 46. The lateral side portions 44 and 46 are disposed along opposite sides of the base body portion 42 and include lateral inclined surface 48 and 50. The lateral inclined surfaces 48 and 50 are angled surfaces that taper inwardly towards the base body portion 42 in a rising direction (indicated by single headed arrow 52). In an exemplary embodiment, the lateral inclined surfaces 48 and 50 taper inwardly at an angle of from about 35 to about 55°, such as from about 40 to about 50°, for example about 45°. As will be discussed in further detail below, the leaf spring devices 24 and 26 are disposed on the lateral inclined surfaces 48 and 50 and are attached to the lateral side portions 44 and 46, respectively, of the member 20.

Figure 5:
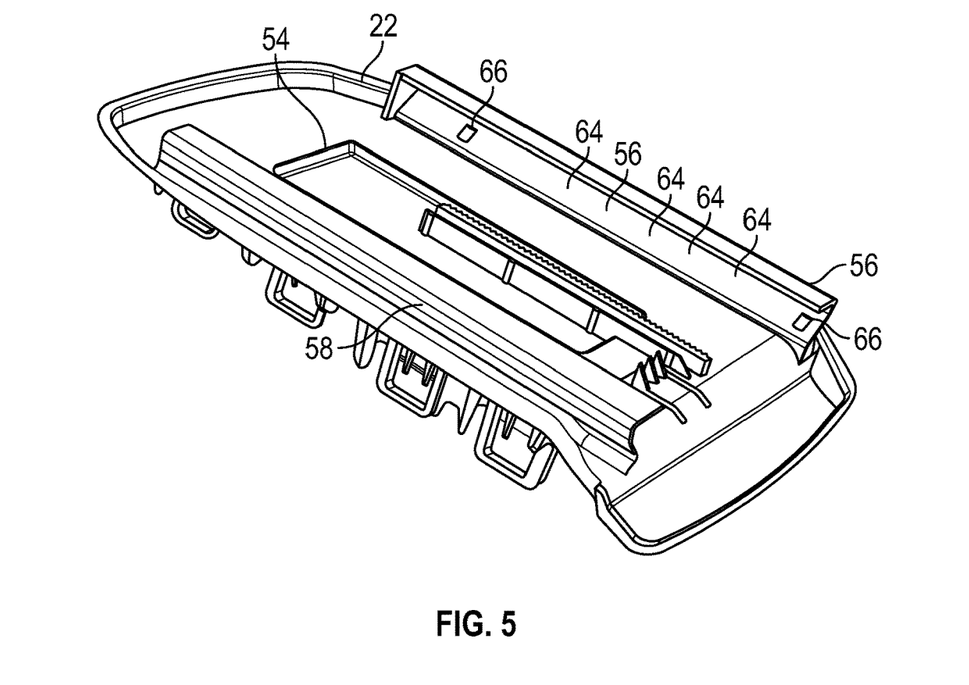
FIG. 5 illustrates a perspective view of a second member of a slide assembly in accordance with an exemplary embodiment.
Figure 6:
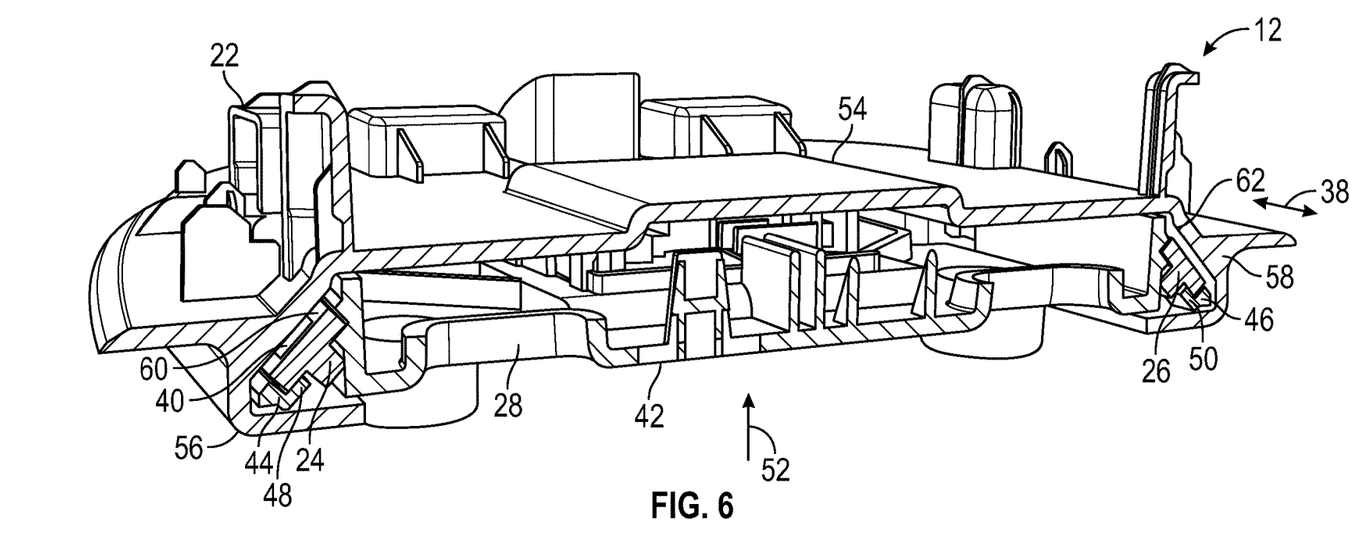
FIG. 6 illustrates a perspective cross-sectional view of a slide assembly in accordance with an exemplary embodiment.
Figure 7:
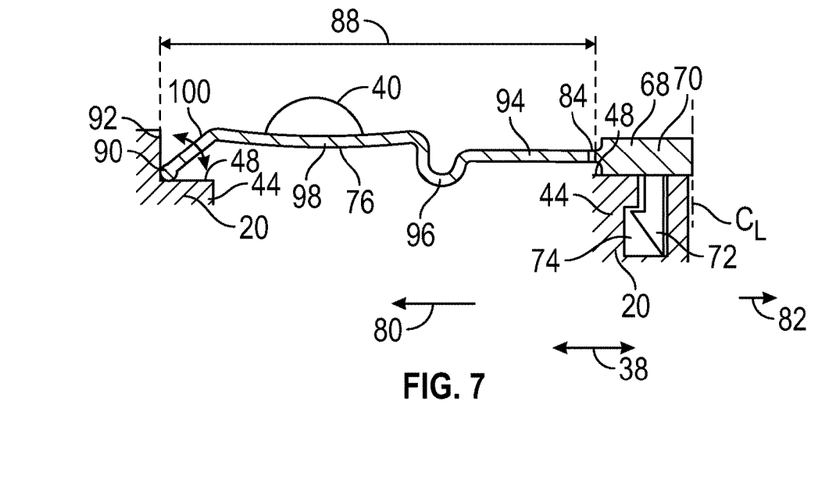
FIG. 7 illustrates a side view of a leaf spring device in accordance with an exemplary embodiment.

In an exemplary embodiment, the member 22 has a body portion 54 that extends between lateral side portions 56 and 58. The lateral side portions 56 and 58 are disposed along opposite sides of the body portion 54. As illustrated, the lateral side portions 56 and 58 of the member 22 are configured as tracks that receive and are slidingly coupled with the lateral side portions 44 and 46, respectively, of the member 20. As such, the members 20 and 22 can slide relative to each other along the lateral side portions 44, 46, 56, and 58 in the forward-to-rearward direction 38.

The lateral side portions 56 and 58 of the member 22 include lateral inclined surface 60 and 62. The lateral inclined surfaces 60 and 62 of the member 22 are spaced apart from and substantially parallel with the lateral inclined surfaces 48 and 50, respectively, of the member 20. In an exemplary embodiment, the raised contact portions 40 of the leaf spring devices 24 and 26 contact and slide along a longitudinal path 64 or portion of the lateral inclined surfaces 60 and 62 of the member 22 in the forward-to-rearward direction 38 during relative sliding movement between the members 20 and 22.

In an exemplary embodiment, at opposing ends of the longitudinal path 64 are negative features 66, such as indents, holes, openings or other apertures, formed in the lateral side portions 56 and 58. As will be discussed in further detail below, the negative features 66 receive the raised contact portions 40 at the end of travel along the longitudinal path 64 to releasably hold the member 22 in either the stowed position 25 (e.g., first stop position) or the extended position 27 (e.g., second stop position).

Referring to FIGS. 3-4 and 7-10, in an exemplary embodiment, each of the leaf spring devices 24 and 26 include an attachment portion 68 that includes a body attachment portion 70 and attachment features 72 extending from the body attachment portion 70. The attachment features 72 are configured to attach the corresponding leaf spring device 24 and 26 to the member 20. As illustrated, the attachment features 72 are configured as positive attachment features, snap-fit features or the like that are received and secured in negative attachment features 74, e.g., openings or the like, formed in the corresponding lateral side portions 44 and 46 of the member 20. As such, the attachment portions 68 are fixedly coupled to the member 20, thereby securing or otherwise attaching the leaf spring devices 24 and 26 to the member 20.

In an exemplary embodiment, each of the leaf spring devices 24 and 26 includes leaf spring sections 76 and 78 e.g., corresponding to first leaf spring section and second leaf spring section, respectively) extending from opposite sides of the attachment portion 68 in generally opposing directions (indicated by single headed arrow 80 and single headed arrow 82) that correspond to the forward-to-rearward direction 38. In particular, the leaf spring sections 76 and 78 each include a fixed end 84 (e.g., fixed end 84 of leaf spring section 76 corresponds to a first fixed end, and fixed end 84 of leaf spring section 78 corresponds to a third fixed end) that is fixedly coupled to a corresponding side of the attachment portion 68 and extend generally in the corresponding opposing direction 80 or 82 along a leaf spring section total length (indicated by double headed arrow 88) to a rotating end 90 e.g., rotating end 90 of leaf spring section 76 corresponds to a second rotating end, and rotating end 90 of leaf spring section 78 corresponds to a fourth rotating end). The fixed ends 84 are directly fixed to the attachment portions 68 of the corresponding leaf spring device 24 or 26 while the rotating ends 90 are constrained from moving in the corresponding opposing direction 80 or 82 but have a rotational degree of freedom to allow each rotating end 90 to rotate relative to the corresponding lateral inclined surface 48 or 50. As illustrated, the lateral inclined surfaces 48 and 50 are arranged in a depression in the lateral side portions 44 and 46 adjacent to sidewalls 92. The leaf spring sections 76 and 78 are configured such that a spring biasing force pushes the rotating ends 90 against the lateral inclined surfaces 48 and 50 abutted in the corner against the sidewalls 92. As such, the rotating ends 90 are prevented from translating further outward away from the fixed ends 84 in the corresponding opposing direction 80 or 82 by the sidewalls 92 but are allowed some degree of rotation in the corner against the sidewalls 92 and the lateral inclined surfaces 48 and 50.

Figure 8:
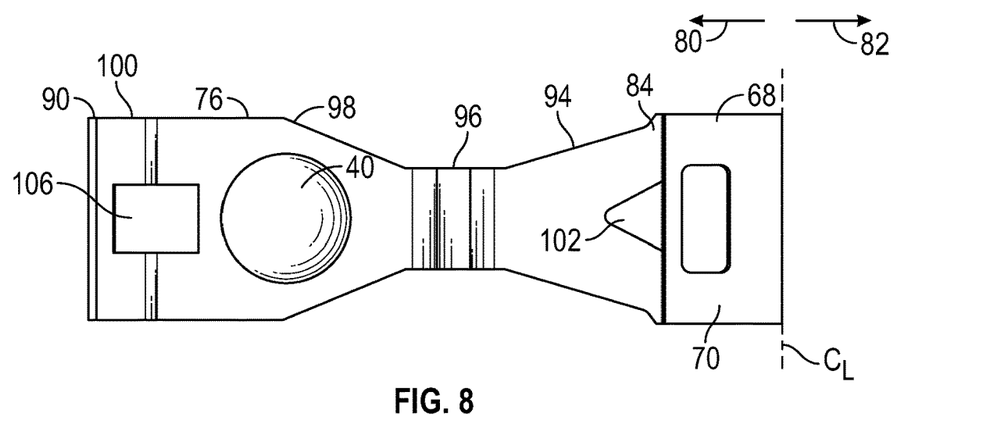
FIG. 8 illustrates a top view of a leaf spring device in accordance with an exemplary embodiment.
Figure 9:
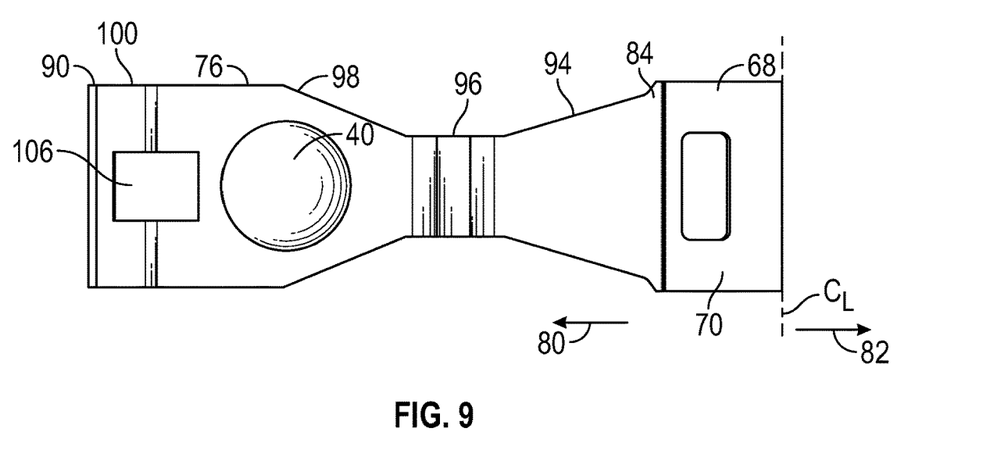
FIG. 9 illustrates a top view of a leaf spring device in accordance with an exemplary embodiment.
Figure 10:
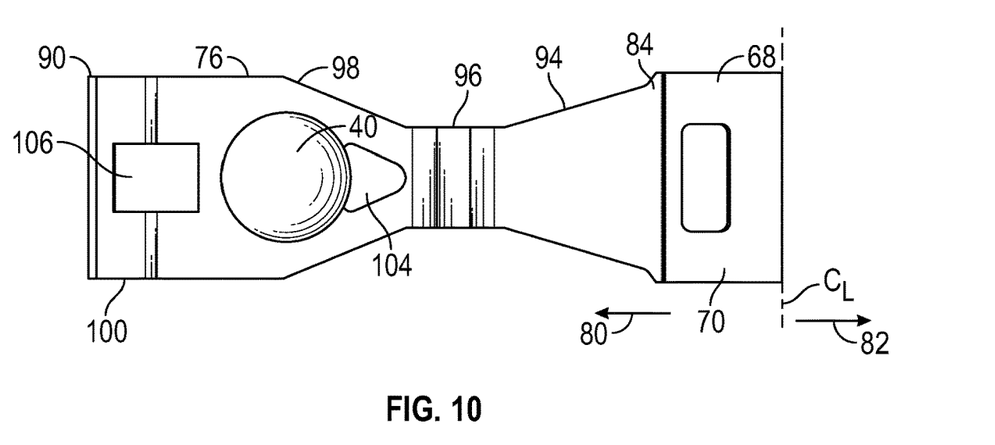
FIG. 10 illustrates a top view of a leaf spring device in accordance with an exemplary embodiment.

Referring also to FIGS. 8-10, in an exemplary embodiment, the leaf spring sections 76 and 78 have a variable or non-uniform shape. As illustrated, the leaf spring sections 76 and 78 each include a tapered portion 94 extending from the fixed end 84 in the corresponding direction 80 or 82, a bent portion 96 extending from the tapered portion 94 in the corresponding direction 80 or 82, a flared portion 98 extending from the bent portion 96 in the corresponding direction 80 or 82, and an angled portion 100 extending between the flared portion 98 and the rotating end 90. The flared portion 98 includes at least a portion of the raised contact portion 40. In an exemplary embodiment, it has been found that by configuring the leaf spring sections 76 and 78 with a variable or non-uniform shape, the various portions of the leaf spring sections 76 and 78 can be independently tuned, such as by modifying its geometry or shape (e.g., increasing or decreasing flare, taper, or bend), to allow the leaf spring sections 76 and 78 to deform in a predictable and consistent manner so that the raised contact portions 40 slidingly interface with the member 22 at a predetermined resistance to facilitate relative sliding movement between the members 20 and 22.

In an exemplary embodiment, one or more openings 102, 104, and 106 may be formed through the leaf spring sections 76 and 78 to help tune the leaf spring sections 76 and 78 to deform in a predictable and consistent manner. The openings 102, 104, and 106 may have various shapes, such as, for example, a circular shape, a polygon shape (e.g. rectangular, triangular, or the like), or any other aperture shape. In one example, the opening 102 (e.g., triangular shape opening) is formed through the tapered portion 94 of the leaf spring sections 76 and 78 as illustrated in FIG. 8. In another example, the opening 104 is formed through the flared portion 98 of the leaf spring sections 76 and 78 as illustrated in FIG. 10. In another example, the opening 106 is formed through the angled portion 100 of the leaf spring sections 76 and 78 as illustrated in FIGS. 8-10.

The leaf spring devices 24 and 26 may be formed of a polymeric material, for example, via an injection molding process or the like. In an exemplary embodiment, the leaf spring devices 24 and 26 are formed of a relatively high temperature creep resistant polymeric material such as polyether sulfone (PES), polyether ether ketone (PEEK), or polyether imide (PEI).

Figure 11A:
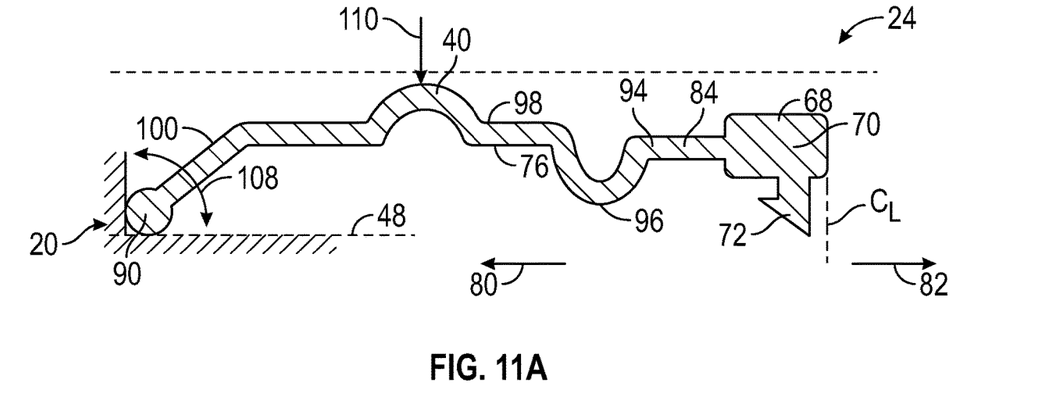
FIG. 11A illustrates a cross-sectional view of a leaf spring device in an uncompressed condition in accordance with an exemplary embodiment.
Figure 11B:
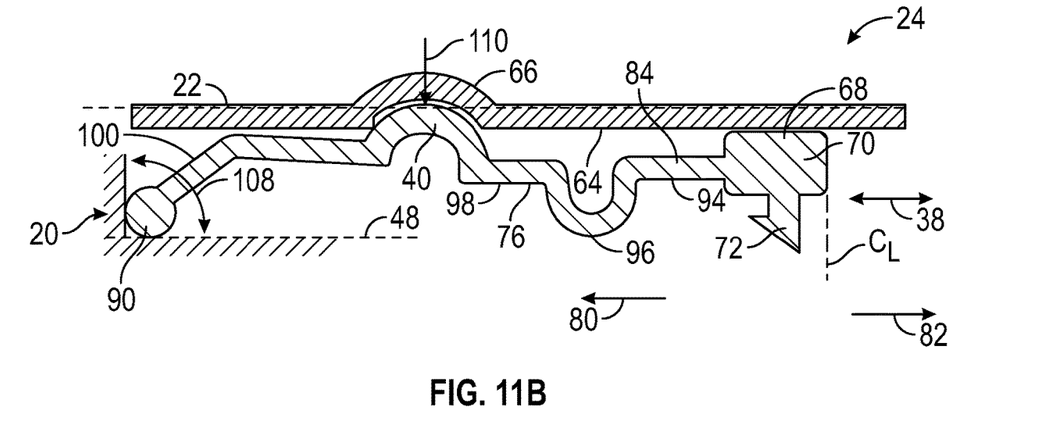
FIG. 11B illustrates a cross-sectional view of a leaf spring device interfacing with a second member of a slide assembly in accordance with an exemplary embodiment.
Figure 11C:
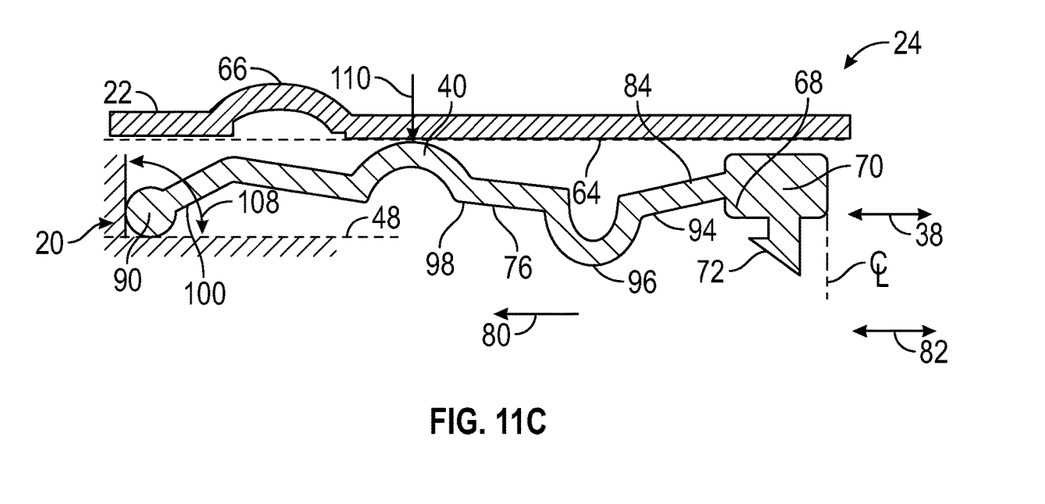
FIG. 11C illustrates a cross-sectional view of a leaf spring device interfacing with a second member of a slide assembly in accordance with an exemplary embodiment.

FIG. 11A illustrates a cross-sectional view of the leaf spring device 24 in an uncompressed condition in accordance with an exemplary embodiment. FIG. 11B illustrates a cross-sectional view of the leaf spring device 24 in a stop position (e.g., stowed or extended position 25 or 27) in accordance with an exemplary embodiment. FIG. 11C illustrates a cross-sectional view of the leaf spring device 24 during relative sliding movement between the members 20 and 22 in accordance with an exemplary embodiment. Referring to FIGS. 11A-11C, as discussed above, the rotating ends 90 of the leaf spring sections 76 and 78 are prevented from translating outward away from the fixed ends 84 in the corresponding opposing direction 80 or 82 by the sidewalls 92 of the member 20 but are allowed limited rotation in the corners against the sidewalls 92 and the lateral inclined surfaces 48 and 50. This together with the cooperation of the variable or non-uniform shape of the leaf spring sections 76 and 78 helps the leaf spring sections 76 and 78 to deform in a predictable and consistent manner so that the raised contact portions 40 slidingly interfaces with the member 22 at a predetermined resistance to facilitate relative sliding movement between the members 20 and 22.

In particular, the angled portions 100 can rotate (indicated by double headed arrow 108) about the rotating ends 90 based on a force (indicated by single headed arrow 110) acting on the raised contact portions 40. In the uncompressed condition as illustrated in FIG. 11A, the force 110 is at a nominal level and the leaf spring sections 76 and 78 are relatively relaxed (e.g., little or no deformation) with the angled portions 100 at a relatively steep rise angle relative to the lateral inclined surfaces 48 and 50. In a first incrementally compressed condition as illustrated in FIG. 11B, the raised contact portions 40 are seated in the negative features 66 of the member 22 corresponding to a stop position (e.g., stowed position 25 or extended position 27). In the first incrementally compressed condition, the force 110 is at an intermediate level and the leaf spring sections 76 and 78 deform accordingly with the angled portions 100 at a relatively intermediate rise angle relative to the lateral inclined surfaces 48 and 50. In a second incrementally compressed condition as illustrated in FIG. 11C, the raised contact portions 40 are in contact with the member 22 along the longitudinal path 64 during relative sliding movement. In the second incrementally compressed condition, the force 110 is at a relatively higher level and the leaf spring sections 76 and 78 deform accordingly with the angled portions 100 at a relatively low rise angle relative to the lateral inclined surfaces 48 and 50. As such, when the force 110 acts on the raised contact portions 40, the various portions, e.g., tapered portion 94, bent portion 96, flared portion 98, and angled portion 100, cooperate to deform or relax in a predictable and consistent manner.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A slide assembly for a motor vehicle comprising:
a first member and a second member that is slidingly coupled with the first member; and
a first leaf spring device disposed between the first and second members for facilitating relative sliding movement between the first and second members, wherein the first leaf spring device includes a raised contact portion that slidingly interfaces with one of the first and second members during the relative sliding movement, wherein the first leaf spring device includes a first leaf spring section having a first fixed end and a second rotating end, and wherein the first leaf spring section extends generally in a first direction along a first leaf spring section total length from the first fixed end to the second rotating end that is constrained from moving in the first direction, and wherein the raised contact portion is disposed between the first fixed end and the second rotating end.

2. The slide assembly of claim 1, wherein the first leaf spring section includes:
a first tapered portion extending from the first fixed end in the first direction;
a first bent portion extending from the first tapered portion in the first direction;
a first flared portion extending from the first bent portion in the first direction; and
a first angled portion extending between the first flared portion and the second rotating end.

3. The slide assembly of claim 2, wherein the first flared portion includes at least a portion of the raised contact portion.

4. The slide assembly of claim 2, wherein the first leaf spring section has an opening formed through the first tapered portion.

5. The slide assembly of claim 2, wherein the first leaf spring section has an opening formed through the first flared portion.

6. The slide assembly of claim 2, wherein the first leaf spring section has an opening formed through the first angled portion and extending towards the raised contact portion.

7. The slide assembly of claim 1, wherein the first leaf spring device includes an attachment portion that includes a body attachment portion and an attachment feature extending from the body attachment portion and attached to the first member, and wherein the first fixed end of the first leaf spring section is coupled to a first side of the body attachment portion and the raised contact portion slidingly interfaces with the second member during the relative sliding movement.

8. The slide assembly of claim 7, wherein the body attachment portion has a second side that is opposite the first side, wherein the first leaf spring device includes a second leaf spring section that extends generally in a second direction along a second leaf spring section total length from a third fixed end that is coupled to the second side of the body attachment portion to a fourth rotating end that is constrained from moving in the second direction, wherein the second leaf spring section includes an additional raised contact portion that is disposed between the third fixed end and the fourth rotating end and that slidingly interfaces with the second member during the relative sliding movement.

9. The slide assembly of claim 1, further comprising a second leaf spring device disposed between the first and second members for facilitating the relative sliding movement between the first and second members, wherein the second leaf spring device includes an additional raised contact portion that slidingly interfaces with one of the first and second members during the relative sliding movement.

10. The slide assembly of claim 9, wherein the first member has a first lateral side portion including a first lateral inclined surface and a second lateral side portion opposite the first lateral side portion and including a second lateral inclined surface, and wherein the first leaf spring device is disposed on the first lateral inclined surface attached to the first lateral side portion and the second leaf spring device is disposed on the second lateral inclined surface attached to the first lateral side portion, and wherein the raised contact portion and the additional raised contact portion slidingly interface with the second member during the relative sliding movement.

11. The slide assembly of claim 10, wherein the second member has a third lateral side portion and a fourth lateral side portion opposite the third lateral side portion, wherein the third lateral side portion includes a third lateral inclined surface that is substantially parallel with the first lateral inclined surface and the fourth lateral side portion includes a fourth lateral inclined surface that is substantially parallel with the second lateral inclined surface, and wherein the raised contact portion slidingly interfaces with the third lateral inclined surface and the additional raised contact portion slidingly interfaces with the fourth lateral inclined surface.

12. The slide assembly of claim 11, wherein the third lateral side portion includes a first negative feature and the fourth lateral side portion includes a second negative feature, and wherein the first and second negative features are cooperatively configured to receive the raised contact portion and the additional raised contact portions, respectively, to releasably hold the second member in a stop position relative to the first member.

13. The slide assembly of claim 1, wherein the first leaf spring device is formed of a polymeric material.

14. The slide assembly of claim 13, wherein the polymeric material comprises one of polyether sulfone (PES), polyether ether ketone (PEEK), and polyether imide (PEI).

15. The slide assembly of claim 1, wherein the slide assembly is a slidable armrest assembly.

* * * * *